(12) United States Patent
Nelson

(10) Patent No.: US 7,233,908 B1
(45) Date of Patent: Jun. 19, 2007

(54) METHOD AND SYSTEM FOR PRESENTATION OF SURVEY AND REPORT DATA

(75) Inventor: Eugene C. Nelson, Norwich, VT (US)

(73) Assignee: Quality Data Management, Inc., Cleveland, OH (US)

( * ) Notice: Subject to any disclaimer, the term of this patent is extended or adjusted under 35 U.S.C. 154(b) by 920 days.

(21) Appl. No.: 10/011,014

(22) Filed: Nov. 5, 2001

Related U.S. Application Data

(60) Provisional application No. 60/245,769, filed on Nov. 3, 2000.

(51) Int. Cl.
*G06F 17/30* (2006.01)
(52) U.S. Cl. ................................................. 705/10
(58) Field of Classification Search .................... 705/3, 705/11, 10; 709/223
See application file for complete search history.

(56) References Cited

U.S. PATENT DOCUMENTS

| | | | |
|---|---|---|---|
| 5,909,669 A * | 6/1999 | Havens | 705/11 |
| 6,151,581 A * | 11/2000 | Kraftson et al. | 705/3 |
| 6,877,034 B1 * | 4/2005 | Machin et al. | 709/223 |

FOREIGN PATENT DOCUMENTS

WO    WO 9959096 A1 *  11/1999

OTHER PUBLICATIONS

Day, Leslie E. Overmyer. "Benchmarking Training". Nov. 1995. Training & Development, vol. 49, Issue 11. pp. 26-30.*
Bhavnani, Sujata M. "Benchmarking in health-system pharmacy: Current research and practical applications". Oct. 15, 2000. American Society of Health-System Pharmacists, Inc. vol. 57. Supplement 2. pp. s13-s20.*
"Sprint, QDM to co-market Health Care Management Systems." Feb. 18, 1997. Business Wire.*
Eugene C. Nelson et al, Clinical Improvement Action Guide, 1998, pp. 25, 71, 93.

* cited by examiner

*Primary Examiner*—Catherine M. Tarae
*Assistant Examiner*—Peter H. Choi
(74) *Attorney, Agent, or Firm*—Pearne & Gordon LLP

(57) ABSTRACT

A data presentation system and method for selecting, processing, and displaying survey information for evaluative purposes, which includes a storage device, a display device, a server, and a network connecting the server to the display device. The server is programmed to maintain in the storage device a database with data information from a data collection, perform calculations on the data information from the data collection, and produce on the display device graphical data displays indicating measurement results based on selected population characteristics.

16 Claims, 19 Drawing Sheets

METHOD AND SYSTEM FOR PRESENTATION OF SURVEY AND REPORT DATA

This application claims the benefit of U.S. Provisional Application 60/245,769 filed Nov. 3, 2000.

COPYRIGHT STATEMENT

A portion of the disclosure of this patent document contains material that is subject to copyright protection. The copyright owner has no objection to the facsimile reproduction by anyone of the patent document or disclosure, as it appears in the Patent and Trademark Office patent file or records, but otherwise reserves all copyright rights whatsoever.

FIELD OF INVENTION

The present invention relates to a method and system for evaluating the quality of goods and services based on survey ratings and reports from customers, and more specifically for evaluating patient care programs.

BACKGROUND OF THE INVENTION

Conventional approaches to access customer satisfaction information generally use standard survey forms or questionnaires by mail or telephone. Survey results are then tabulated or summarized in order to evaluate the information. However, any project or initiative will generally have an overwhelming number of measurement options. Pursuing all of them results in data overload and frustration.

The compass viewpoint concept is a tool that can be used to help evaluate customer satisfaction and focus improvement efforts. This improvement process provides a framework for developing a balanced measurement profile for an initiative by focusing on a small set of measures. The concept consists of four points which display four main outcome measurement categories or areas of measurement. Key measures of the initiative are then selected by addressing what variables or subcategories might be considered under each of the points.

In the health care system, the four outcome measurement categories are clinical, functioning, satisfaction, and cost. Like a directional compass, the points correspond to key aspects of quality and performance for both patients and staff. Clinical includes measures of mortality and morbidity, such as signs, symptoms, treatment complications, diagnostic test results and laboratory results, and disease-specific measures. Functional consists of measures of physical function, mental health, social/role function, and other measures of health status, such as pain, vitality, and perceived well-being and health risk status. Satisfaction includes measures of satisfaction such as patient and family satisfaction with health care delivery processes, a patient's perceived health benefit from care received, and employee satisfaction with work environment. Cost consists of measures of direct medical costs (e.g., ambulatory care, inpatient services, and medications) and indirect social costs (e.g., days lost from work or normal routine, replacement worker costs, and caregiver costs). A detailed description of the compass viewpoint can be found in "Clinical Improvement Action Guide," edited by Nelson, Batalden, and Ryer, 1998, which is incorporated herein by reference.

However, this improvement process has several limitations. In depth application of the compass viewpoint and evaluation of the information collected need several measurement methods. These methods include control charts indicating variations in trends over time, patient preferences, rating scales, benchmarking, cost analysis, and cross related measurements. In addition, evaluators of a survey assessment may be interested in detailed reasons behind an answer in a particular situation, such as when a participant is very dissatisfied with a service or product, while the same evaluator may not care why a survey participant was satisfied with a different service or product. Processing stated reasons and such measurement methods using standard techniques can be difficult, time-consuming, and costly. Thus, there is a need for a computer-implemented system and method based on the improvement process that allows for presenting collected survey information in a compass viewpoint framework.

It would also be advantageous to automate the analysis and presentation of the collected survey information to enable a user to more easily and efficiently review the collected information. Modern computer and networking technology provide potential solutions to these problems. Advances in database design, computer processing, and computer networking all provide means to improve the process of analyzing and evaluating survey information. Accordingly, an adaptable survey presentation procedure would be useful, one that indicates the depth of measurements on certain topics depending on the answers given to questions on that topic, and that utilizes computer technology to process calculations and verbal replies.

BRIEF SUMMARY OF THE INVENTION

According to the present invention, the data presentation system and method includes a storage device, a display device, a server, and a network connecting the server to the display device. The server is programmed to maintain in the storage device a database with data information from a data collection, perform calculations on the data information from the data collection, and produce on the display device graphical data displays indicating measurement results based on selected population characteristics.

The method and system manage information on a technology platform that fully integrates data collection results, data computation, and data presentation into one system. Unlike traditional evaluation processes, the data collection information is also updated regularly and may be accessed via the internet or other network system.

DETAILED DESCRIPTION OF THE INVENTION

Figure 1:
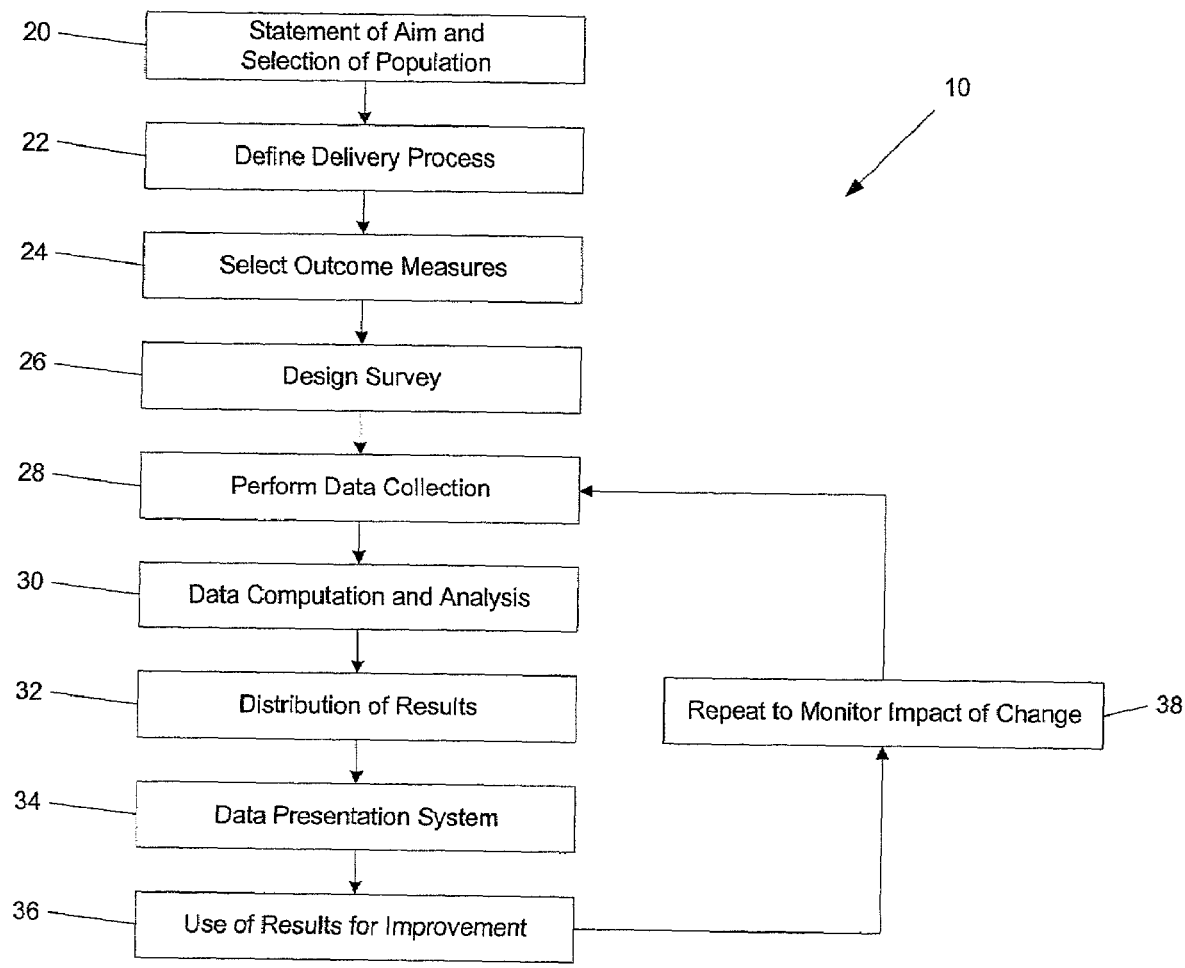
FIG. 1 is a block diagram showing an improvement process which includes an embodiment of the present invention.

The data presentation system and method are part of an improvement process that involves compiling and presenting data. As illustrated in FIG. 1, a typical improvement process based on the compass viewpoint framework 10 includes several steps in order to evaluate and improve a project or initiative. These steps include stating the aim of the initiative and selecting a target population to evaluate 20, defining the delivery process of the customer initiative being evaluated 22, selecting outcome measures and determining the performance measurements or subcategories to be measured 24, designing a survey questionnaire or data collection plan based on the selected measurements 26, performing the data collection plan 28, computing and analyzing the data collection results 30, and then distributing the results 32. An operator or user then utilizes the data presentation system 34 to analyze and evaluate the results of the data collection and to implement changes to improve the customer initiative 36. Finally, the data collection plan is repeated in order to monitor the impact of the change 38.

Figure 2:
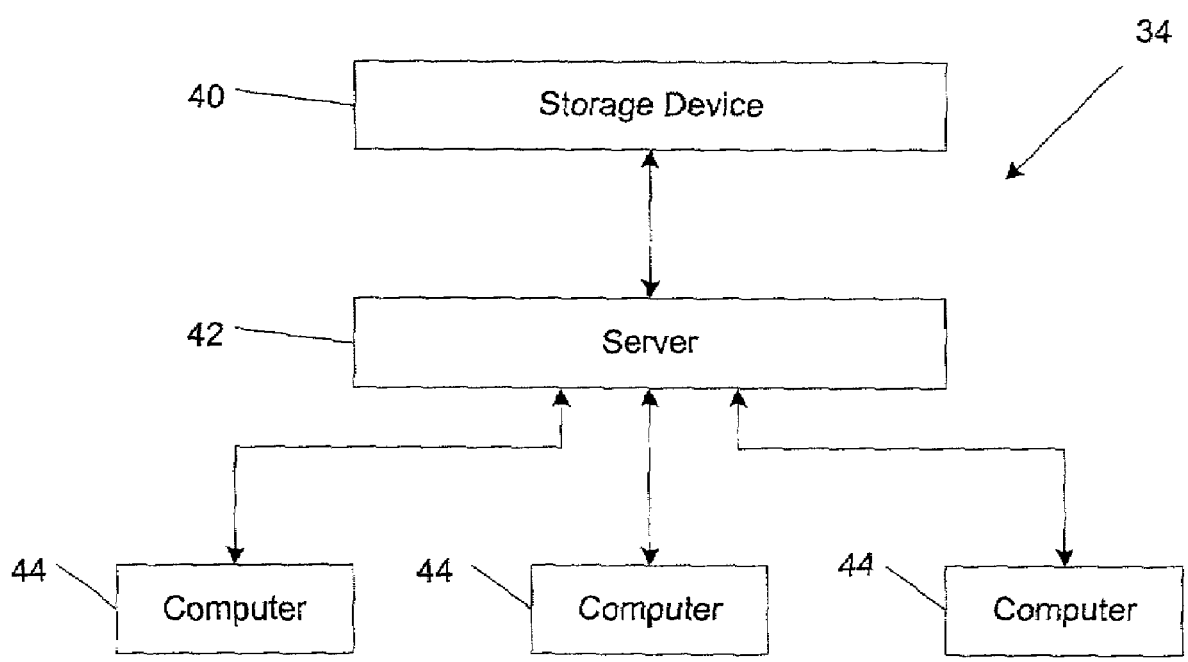
FIG. 2 is a flow chart showing an embodiment of the data presentation system.

FIG. 2 is a block diagram of a data presentation system (DPS) 34 in accordance with one embodiment of the present invention. DPS includes a server system 40 connected to a centralized storage device or database 42 and a plurality of user devices 44. The database 42 contains the survey or business data and may be stored on the server 40 or can be stored remotely from server 40. The database 42 may be further divided into a survey information data section, a historical data section, and a comparative practice data section and be interconnected to update and retrieve the information as required. The user devices 44 are computer terminals including a web browser, which access the server system 40 via a network 46, such as an internet, an intranet or other private network. The user devices may also include any device capable of interconnecting to the network 46 including a web-based hand-held device or other connectable equipment.

In an exemplary embodiment, the server 40 authenticates the user for access to the data collection and encrypts and de-encrypts transferred data. The server system 40 is more fully discussed in co-pending application INTEGRATED COMMUNICATION SYSTEM AND METHOD, by Nelson et al., Ser. No. 09/871,420, filed on May 31, 2001 and incorporated herein by reference. The server system 40 may also be further divided into multiple servers and multiple databases as discussed in co-pending application PHYSICIAN OFFICE VIEWPOINT SURVEY SYSTEM AND METHOD, Ser. No. 10/008,027 by McEachen, filed on Nov. 5, 2001, and incorporated herein by reference. Co-pending application, SYSTEM AND METHOD FOR PRESENTING SURVEY DATA OVER A NETWORK, U.S. Pat. No. 6,889,230, filed on Nov. 5, 2001, by Rogers, is also incorporated herein by reference.

Figure 3:
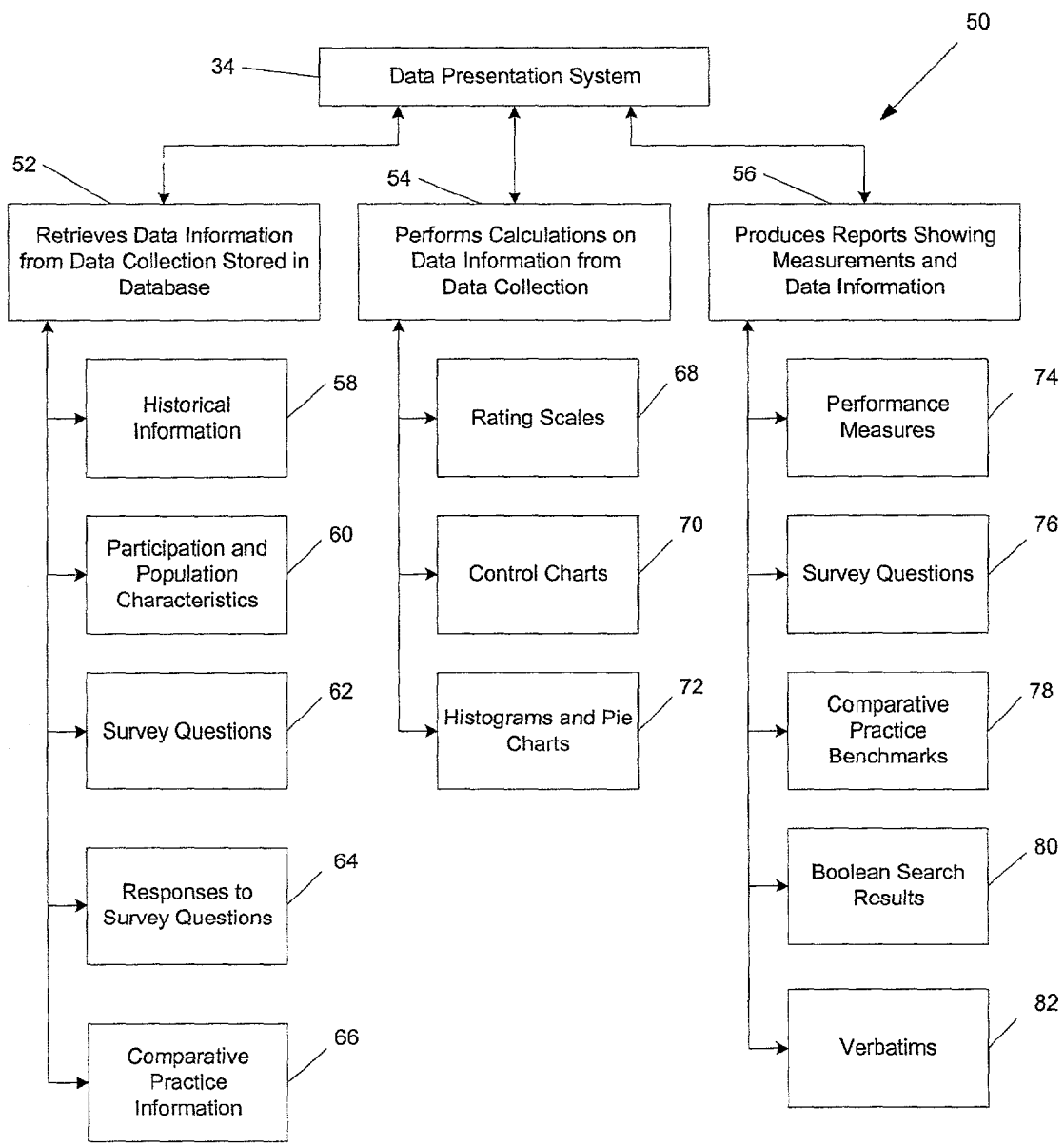
FIG. 3 is a diagram showing an exemplary configuration for the system shown in FIG. 2.

FIG. 3 is an exemplary embodiment of a diagram 50 for a computer network-based method for utilizing DPS. Processes of the data presentation system involve data reduction and the scoring of data variables, the creations of scales, the statistical analysis of data, and the creation of data displays to generate the presentation screens viewed by the user. The DPS retrieves data information 52 stored in the database, performs calculations 54 on the data information, and produces reports 56 showing data measurements and data information, which can be viewed on the user's computer via graphical display methods. Data information utilized by the DPS include historical information 58, including information from medical, financial and billing records, survey participation and population characteristic 60, survey questions 62, responses to survey questions 64, comparative practice information 66, and other data information as specified for a particular survey, data collection plan, user, or improvement initiative. Calculations and formulas used to produce the reports include those for producing rating scales 68 and statistical process control charts 70, producing histograms and pie charts 72, multivariate methods for adjusting results for case-mix differences, and multiple regression analysis for determining which variables contribute most to explaining variations in outcomes (e.g., patient satisfaction). The data reports indicate measurements on a selected measurement option including performance measures 74, information on survey questions 76, comparative practice benchmarks 78, boolean search results 80, and verbatims 82, which may be actual responses to open-ended questions asked of survey participants, and other qualitative and quantitative measurements.

Figure 4:
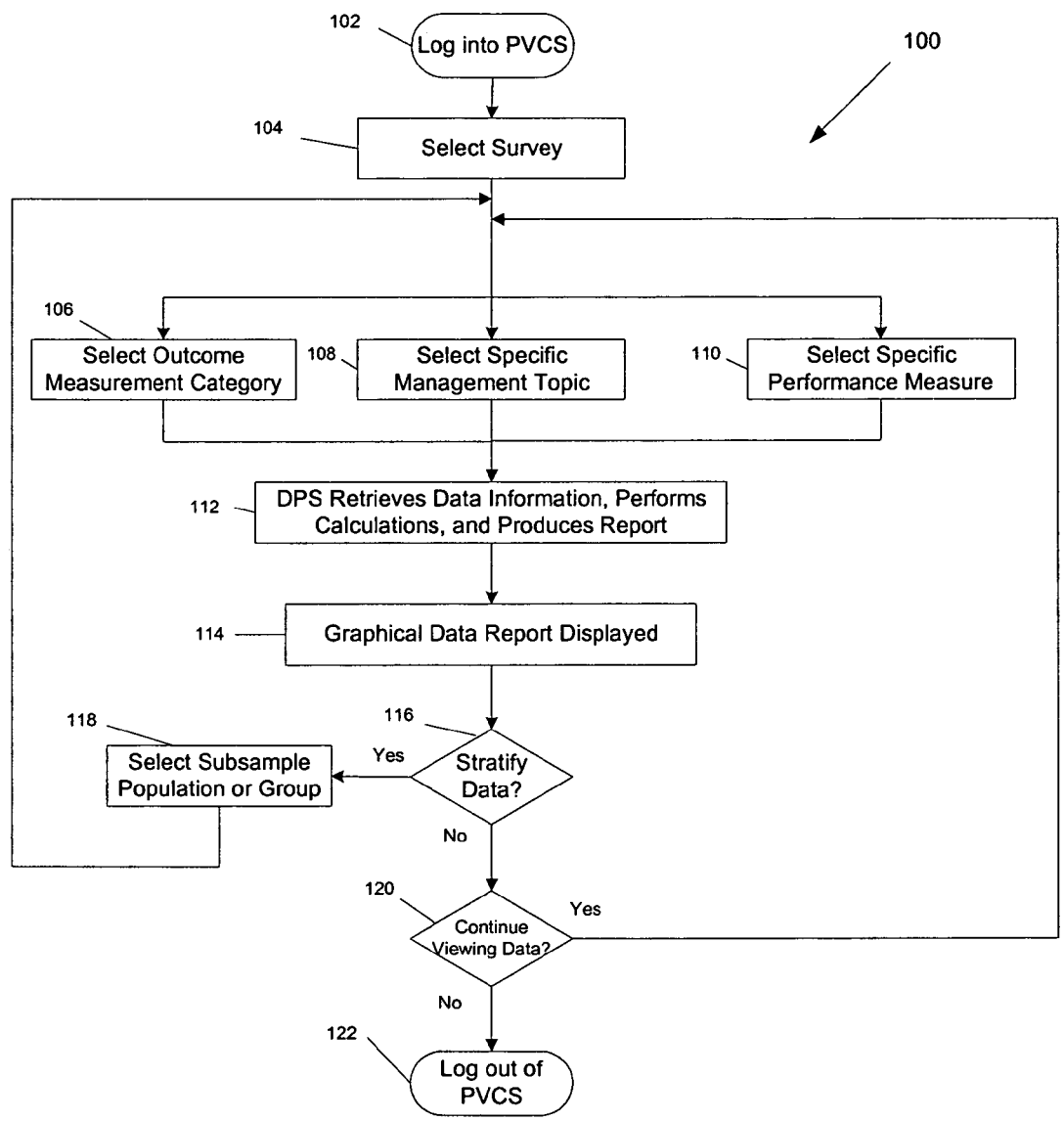
FIG. 4 is a flow diagram for a method of accessing graphical data displays with the system shown in FIG. 2.

FIG. 4 is a flow diagram 100 that illustrates a method for how a user can dynamically navigate the data collection stored in the database in order to directly select, analyze and receive graphical data displays. A user logs into the DPS system 102 and selects a survey 104. The user then selects a measurement option or category to view. In the exemplary embodiment, the user may select a measurement option of a specific outcome measurement category 106, a management topic 108, or a performance measure 110. Depending on the specific user or survey, each of these selections may have further subcategories and various reports to choose from. After a selection is made, the DPS retrieves the data information, performs any necessary calculations, and produces the desired report 112. The report is then displayed 114 on the user's computer using graphic user interface (GUI) features or other graphical data display methods. The user may continue to view and evaluate data 120 by selecting other categories or may first stratify data 116 by a number of subsample populations 118 before selecting another category. The graphical data display may also be printed out at any time by the user's printer (not shown). The user may also select another survey at anytime before logging out of the DPS 122.

Figure 5:
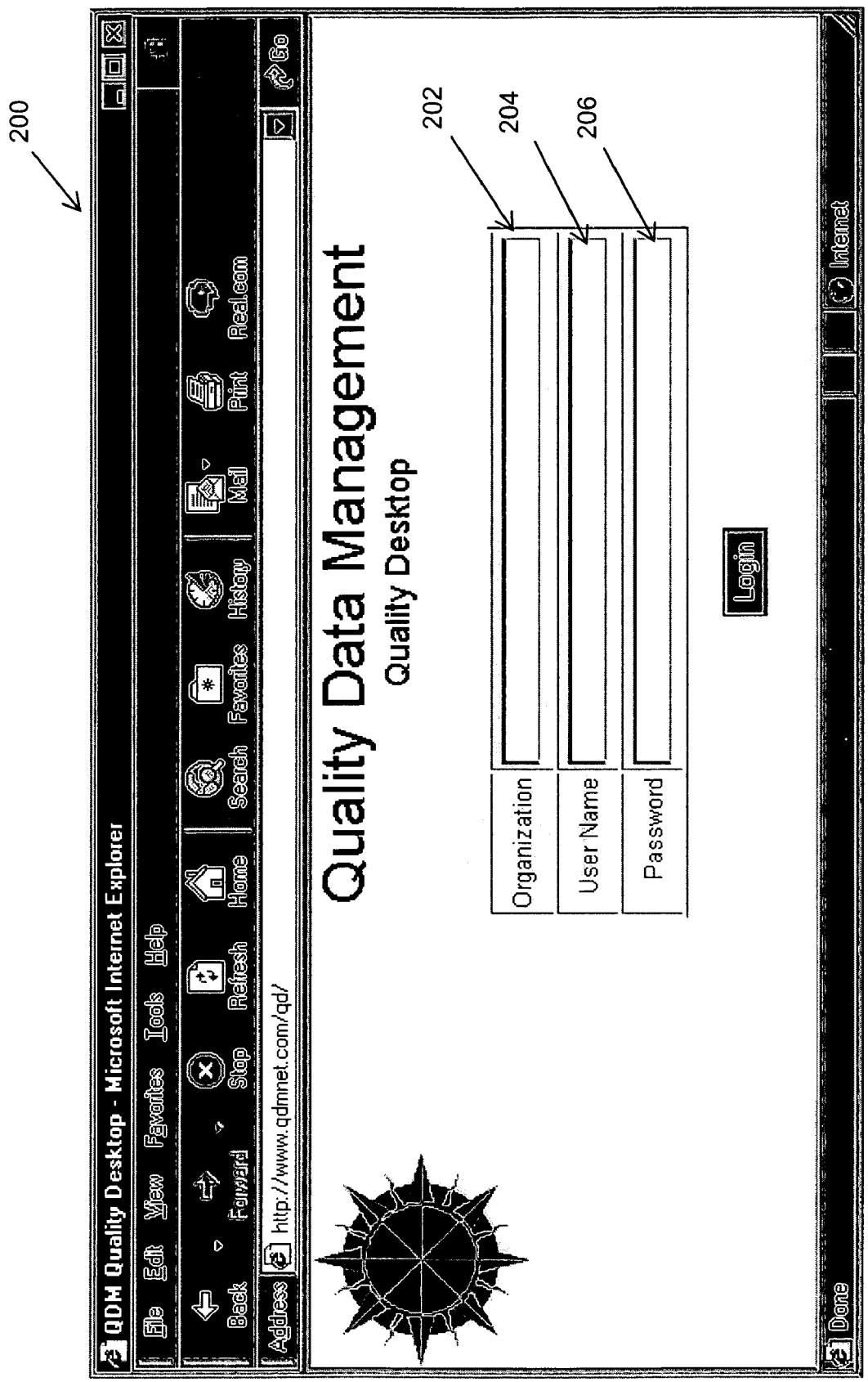
FIG. 5 is an exemplary embodiment of a user login interface.
Figure 6:
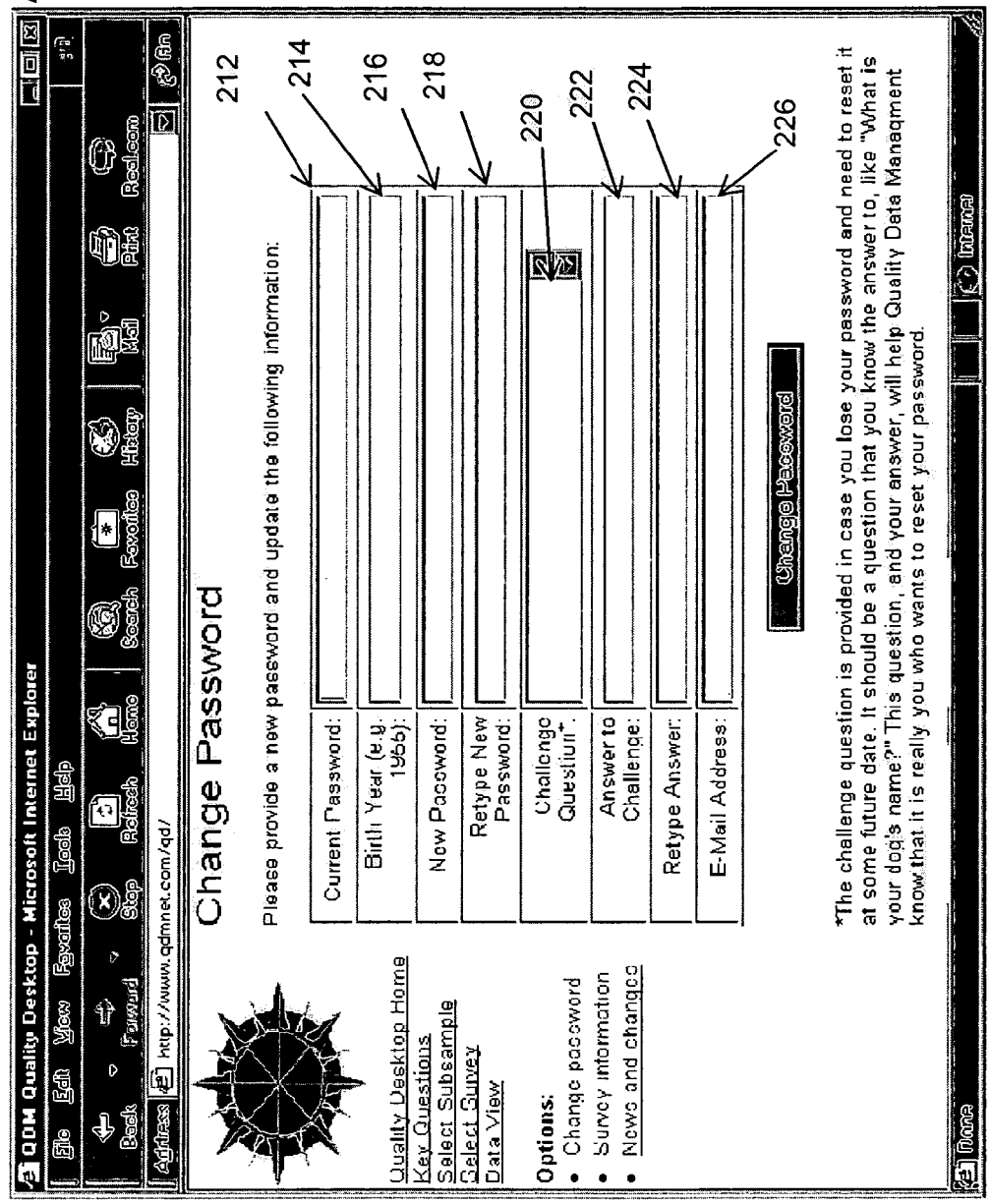
FIG. 6 is an exemplary embodiment of a user password interface.

FIG. 5 is an exemplary embodiment of a DPS user login interface 200. The user login interface 200 facilitates access to the DPS by prompting the user to log into the DPS. The user is prompted to enter an organization 202, a username 204, and a valid password 206 to gain access to the DPS. Upon accessing the DPS for the first time, the user is also prompted to change the initial password to a customized password as shown in FIG. 6. In the user password interface 210, the user is prompted to enter the current password 212, the user's birth year 214, a new password 216, and the new password a second time 218 in order to confirm the new password. The user is also prompted to enter a challenge question 220, an answer to the challenge question 222, the answer to the challenge question a second time 224 in order to confirm the answer, and the user's email address 226. In the exemplary embodiment, if the birth year 214 is answered incorrectly, the user will not be able to change the password. The challenge question 220 will be asked if the user requests any information about the user's existing password.

Figure 7:
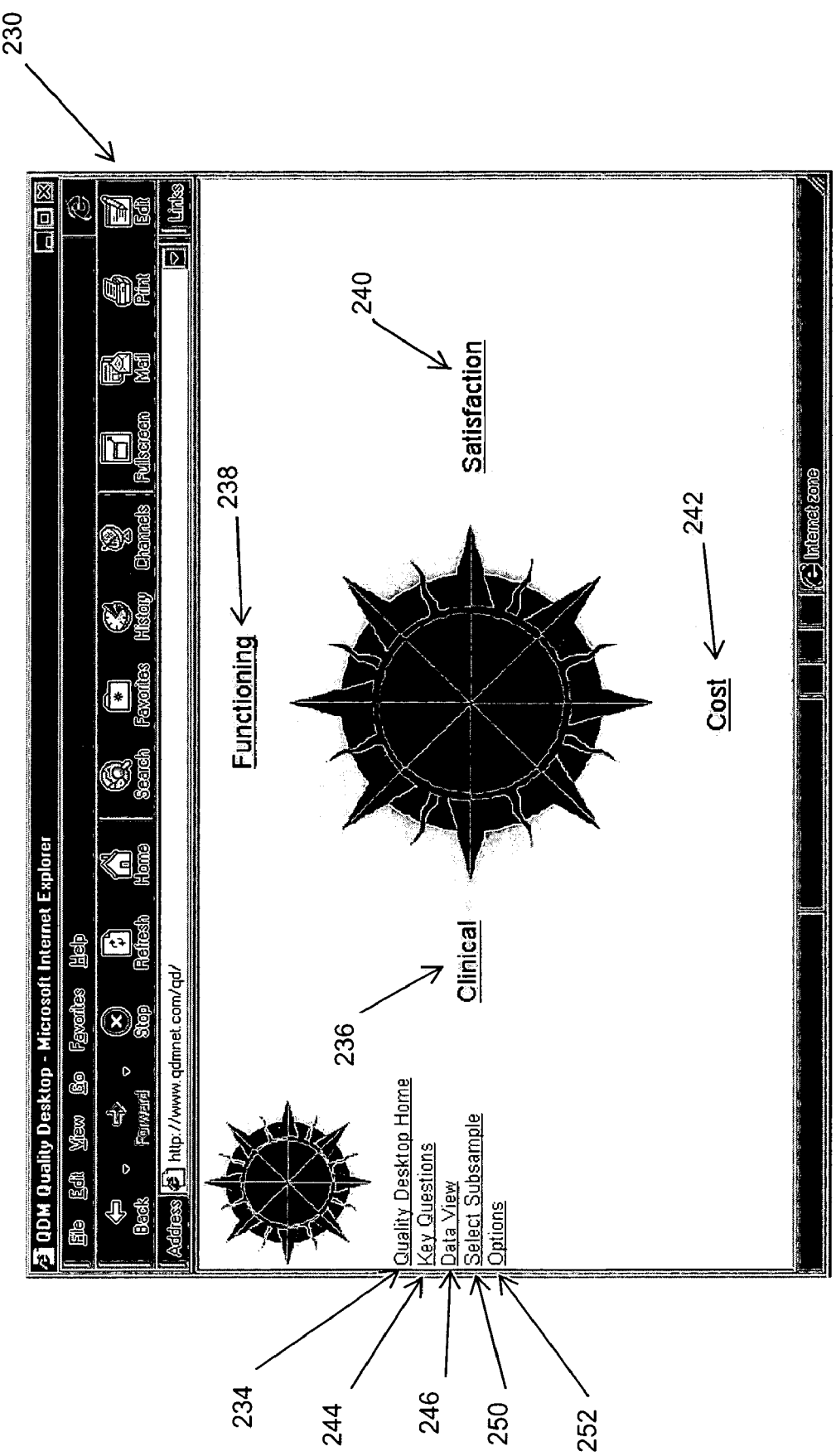
FIG. 7 is an exemplary embodiment of a user main interface.

FIG. 7 is an exemplary embodiment of a DPS user main interface 230. The DPS user main interface 230 lists an outcome measurement menu 232 and a main selection menu 234 from which the user may select categories to view and evaluate reports. In the exemplary embodiment, the outcome measurement menu 232 includes four main outcome measurement categories of Clinical 236, Functioning 238, Satisfaction 240, and Cost 242. The main section menu 244 includes a Home category 244, a Key Questions or management topic category 246, a Data View category 248, a Select Subsample category 250, and an Options category 252. Additional main section menu 234 category options may be provided depending on the specific user. Selection of the Home category will bring the user back to the user main interface 230; selection of one of the other categories listed above provides more detailed user interfaces. The Options category 252 contains other options and interfaces unrelated to the other main selection menu categories. The Options category includes changing a user's password, news and changes concerning the DPS, and participation information for a survey.

Figure 8:
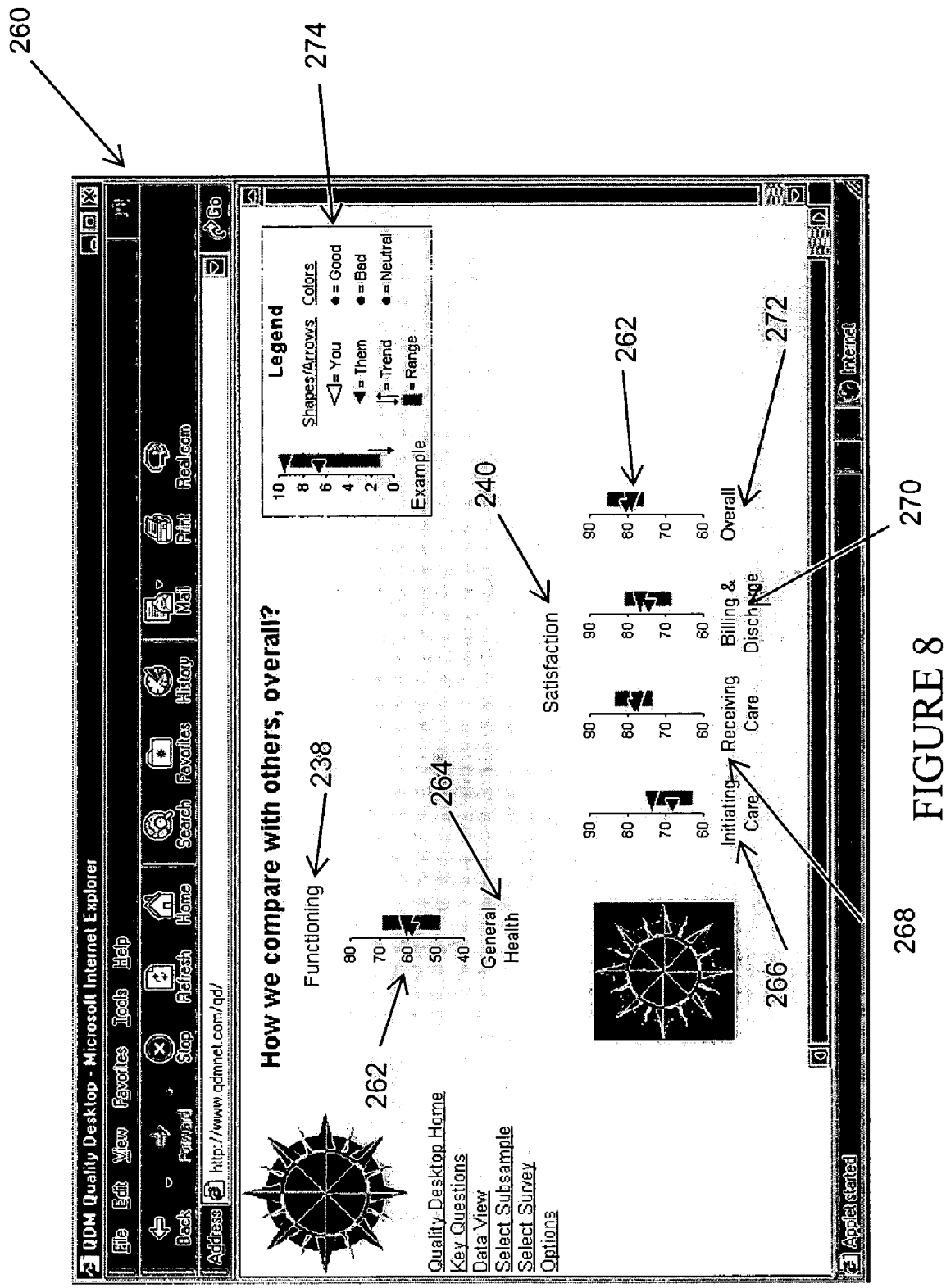
FIG. 8 is an exemplary embodiment of an outcome measurement display with comparative practice information.

FIG. 8 is an exemplary embodiment of an outcome measurement category display 260. The display shows the organization's survey response results in the form of thermometer readings 262 for the Functioning 238 and Satisfaction 240 outcome measurements categories against a comparative group's information. The Functioning category 238 includes the measurement domain or major domain of care of General Health 264. The Satisfaction category 240 includes the measurement domains of Initiating Care 266, Receiving Care 268, Billing & Discharge 270, and Overall Satisfaction 272. Each of the thermometer readings 262 represent a percent maximum achievable score. This score represent the average score for the respondents where the lowest possible score is zero and the highest possible score is one hundred. A legend 274 is included to assist the user in evaluating the display. The range on each of the thermometers indicates the $10^{th}$ to $90^{th}$ percentile range of scores for the organization. The outcome measurement display 260 may show any number of outcome measurement categories depending on the user or survey. The display 260 may also show response results against other regions within the organization or multiple comparative groups.

Figure 9:
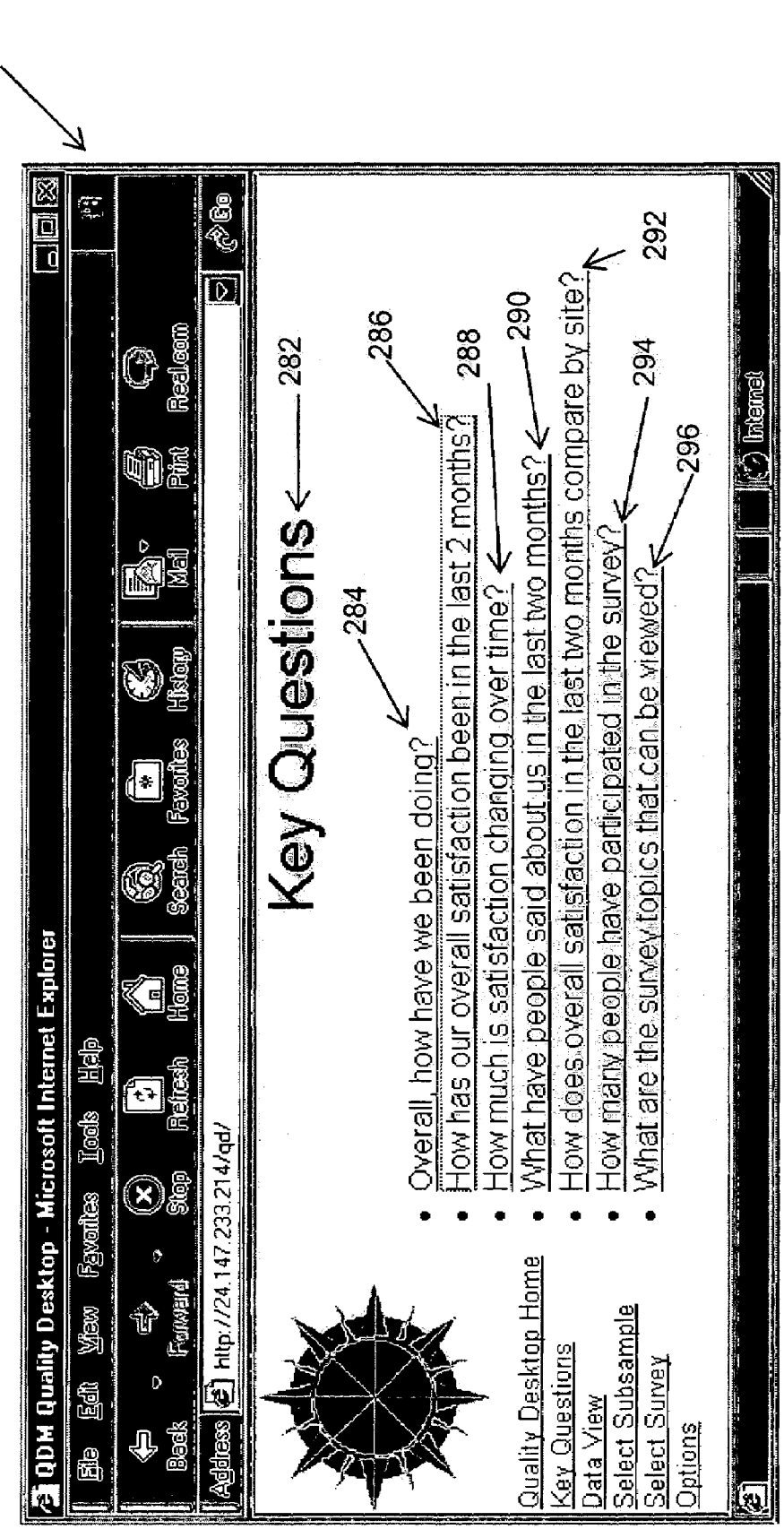
FIG. 9 is an exemplary embodiment of a user management topic interface.
Figure 10:
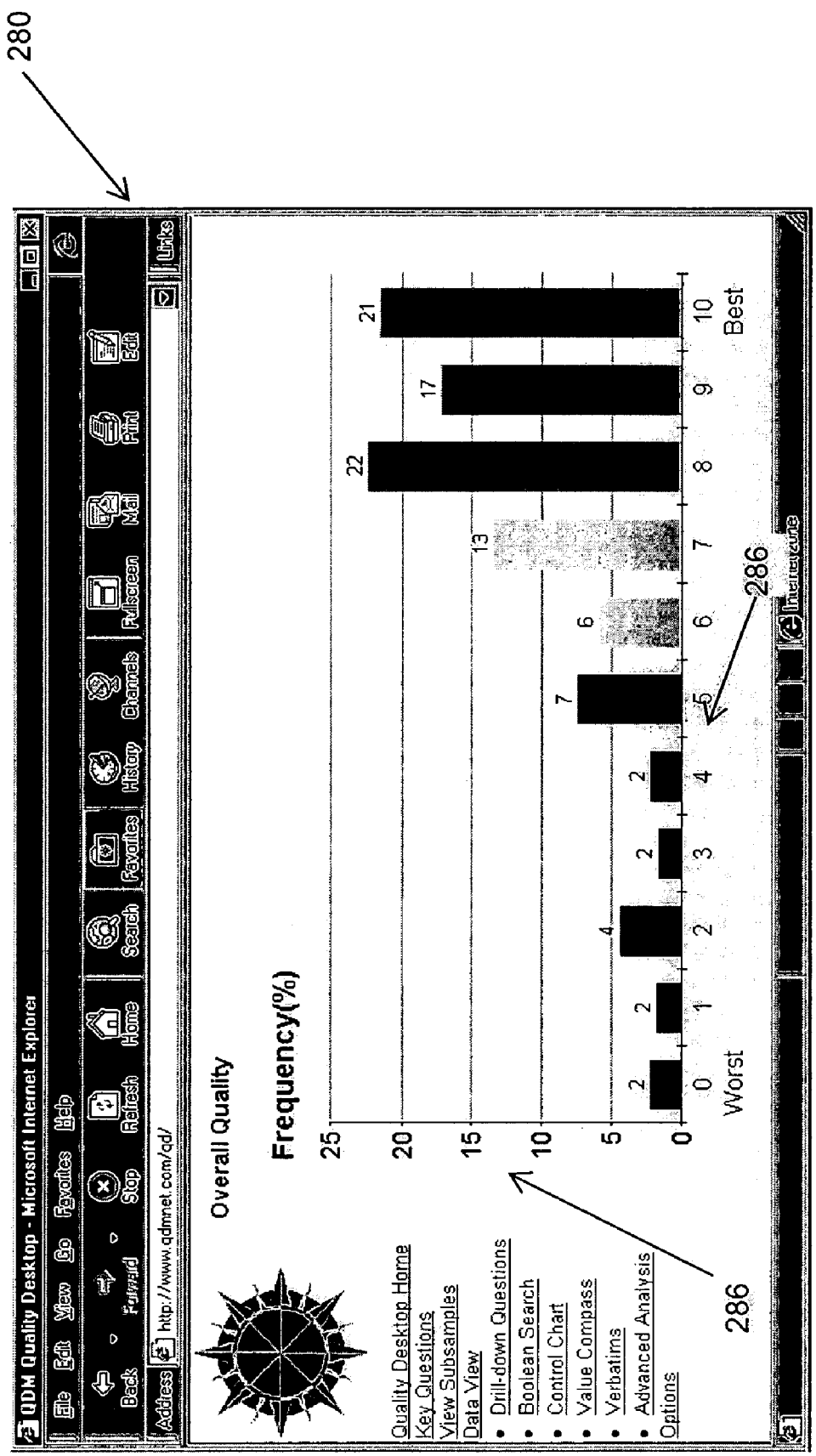
FIG. 10 is an exemplary embodiment of an overall satisfaction display from a specific management question shown in FIG. 9.
Figure 11:
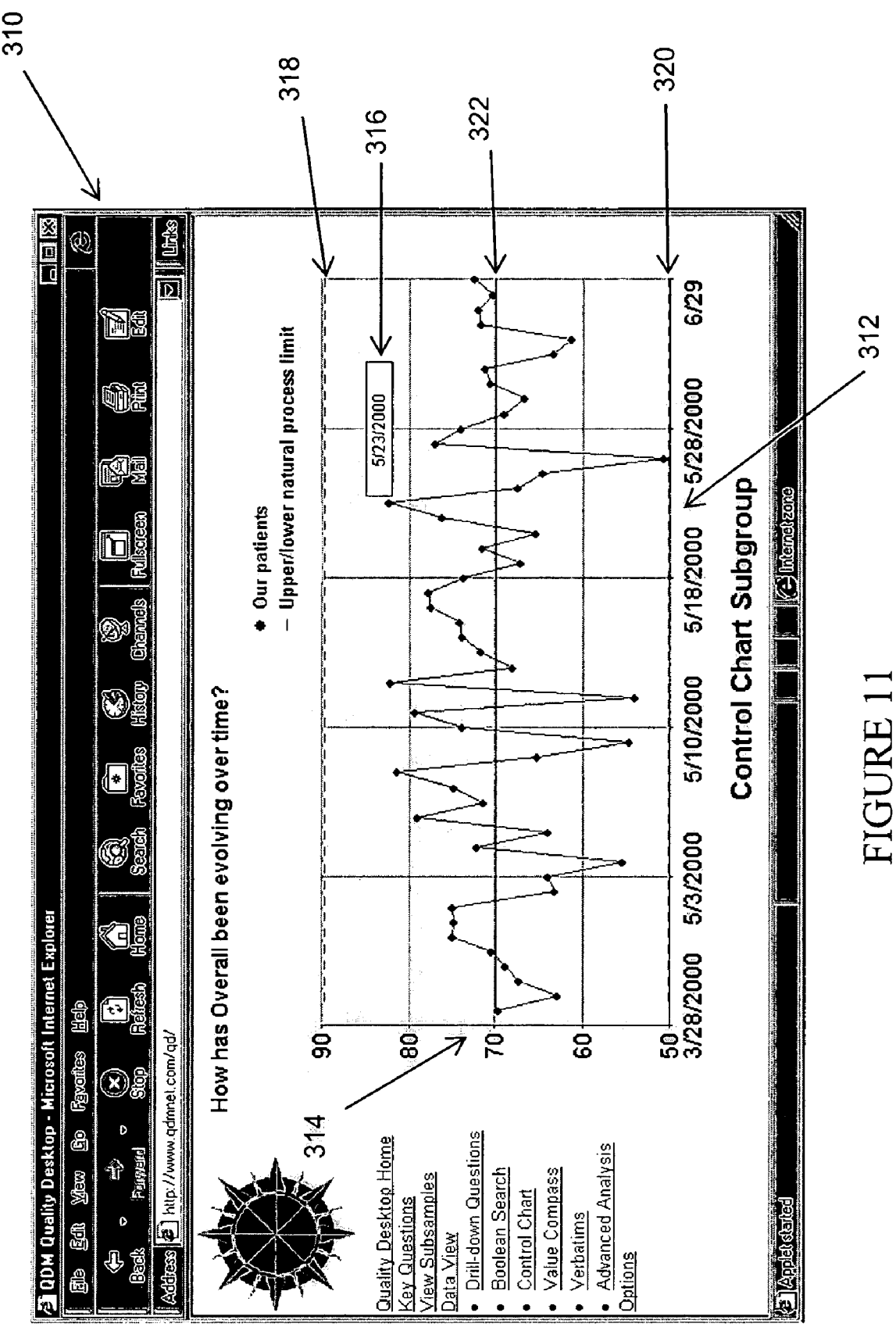
FIG. 11 is an exemplary embodiment of the display of FIG. 10 over a specific time period.

FIG. 9 is an exemplary embodiment of a user management topic interface 280, which is displayed after selecting the Key Questions category 246. The management topic interface 280 lists key questions 282 that are relevant to administration or management in order that the user can quickly identify main trends in the organization. In one embodiment, the topics include, but are not limited to, overall satisfaction 284, overall satisfaction during a specific time period 286, how overall satisfaction has changed over time 288, responses during a specific time period 290, satisfaction compared by site during a specific time period 292, participation characteristics 294, and viewable survey topics 296. FIG. 10 and FIG. 11 illustrate exemplary embodiments of displays generated from the topics of overall satisfaction 284 and how overall satisfaction has changed over time 288, respectively. In FIG. 10, a bar chart 300 shows the respondent results by a scale 302, with zero being the worst to ten being the best, and the frequency percentage 304 of the rankings. A control chart 310 that displays the organizational data for overall satisfaction 314 over time 312 is shown in FIG. 11. The chart includes upper 318 and lower 320 natural process limits and the median 322 of these limits. The date of any data point 316 can be identified by moving the mouse pointer to the data point in question. In the display, the mouse was pointed to the upper most data point, and the date of May 23, 2000 appeared.

Figure 12:
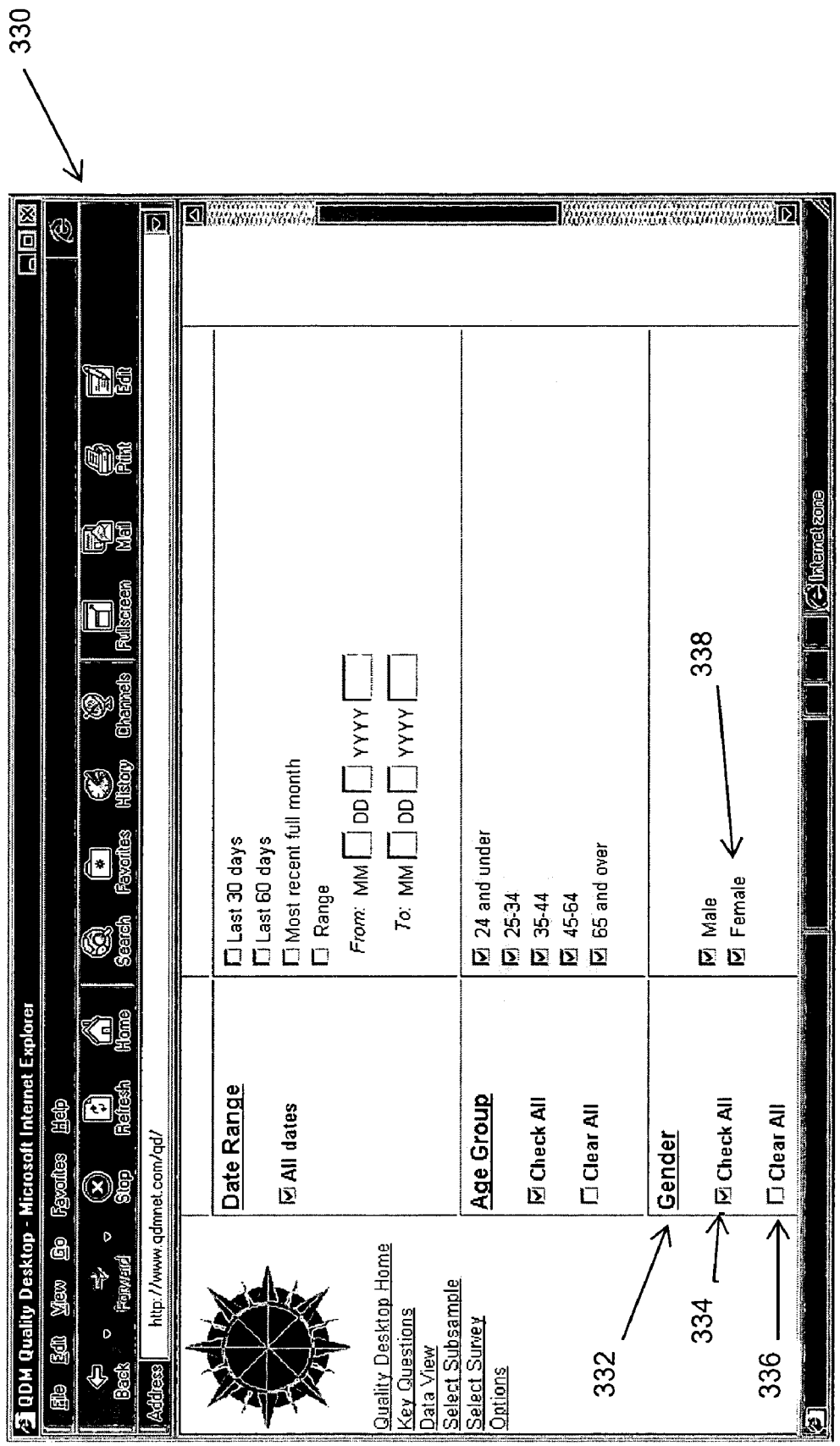
FIG. 12 is an exemplary embodiment of a user subsample interface.
Figure 13A:
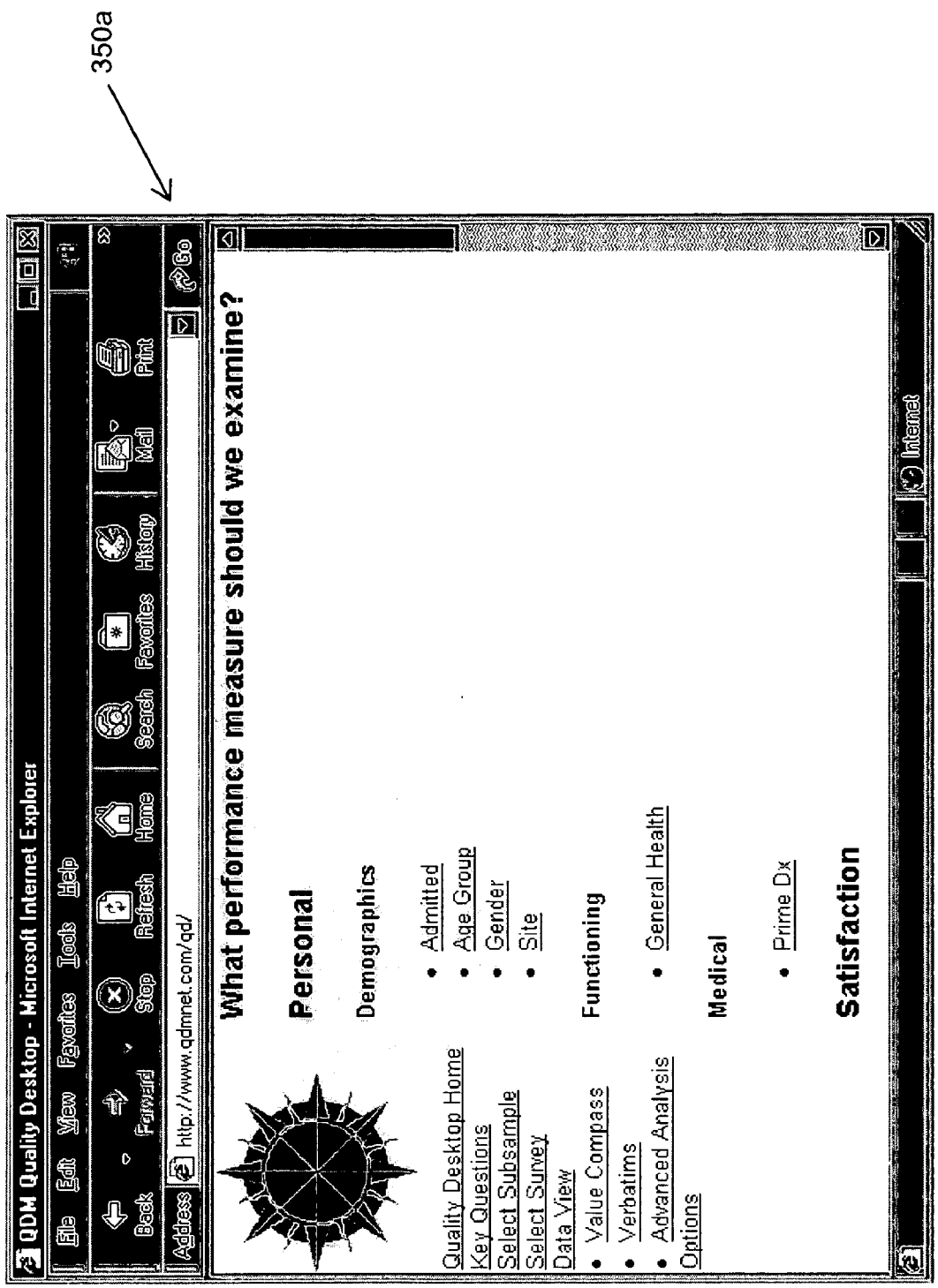
FIGS. 13a and 13b are an exemplary embodiment of a user performance measure interface.
Figure 13B:
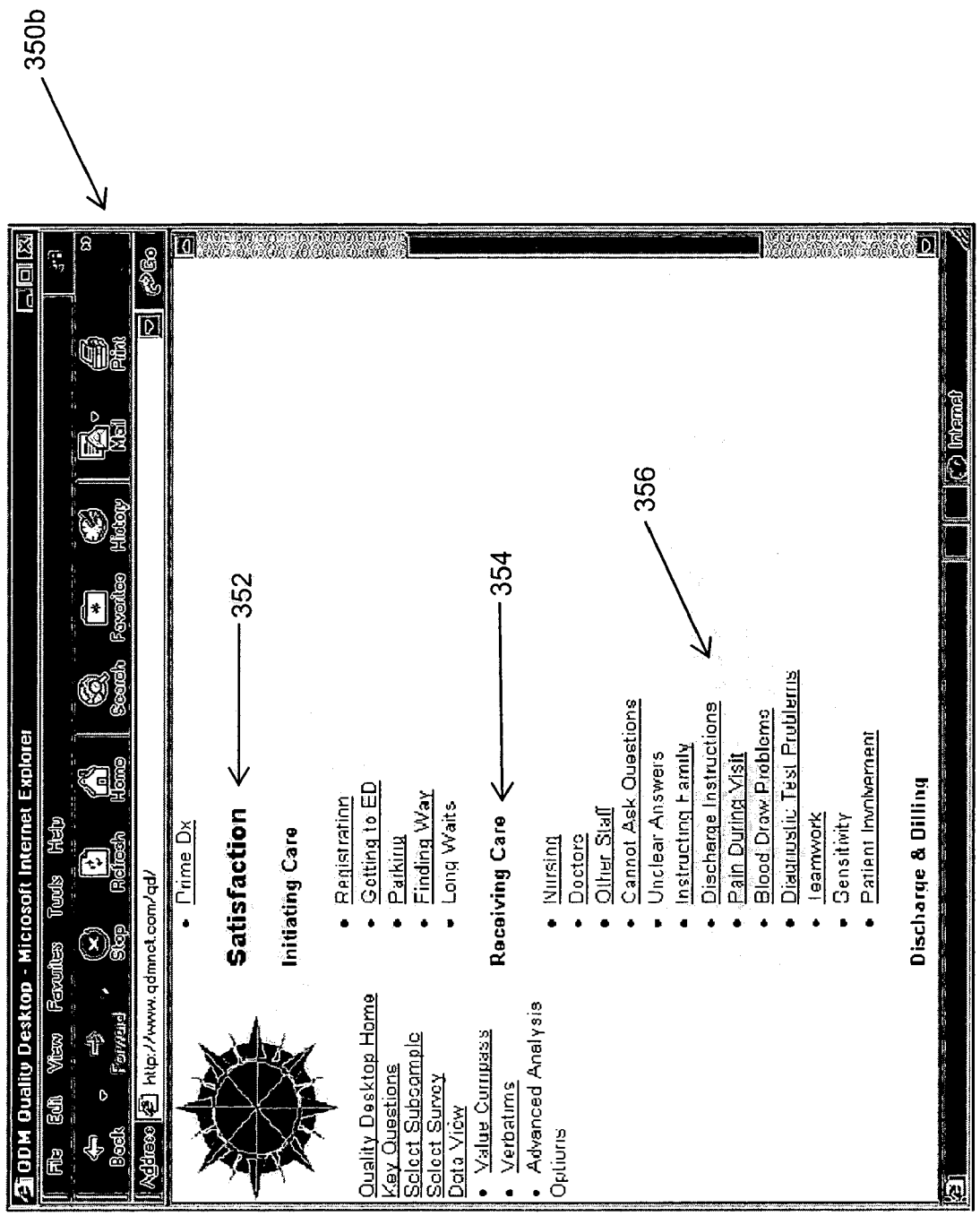
Figure 14:
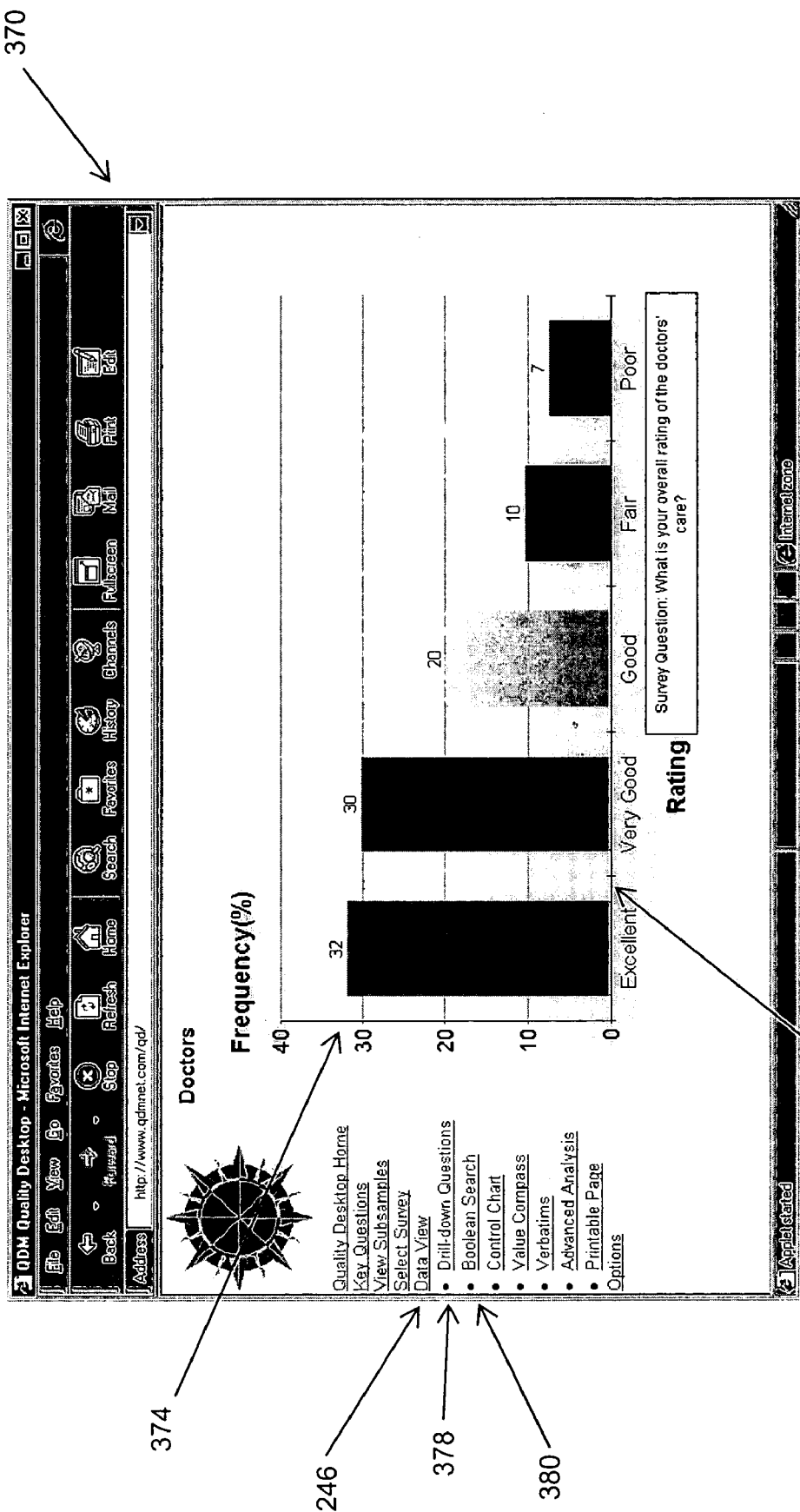
FIG. 14 is an exemplary embodiment of a rating display from a performance measure shown in FIG. 13b.

FIG. 12 is an exemplary embodiment of a user subsample interface 330, which allows the user to stratify data by a number of subsample populations or population characteristics. Subsample populations 332 include data range, age group, gender, site, diagnostic group, and any other population characteristic that would be used in a specific survey. The DPS default is set to select all subsample population options 334 and automatically displays all data unless the user selects clear all 336 or a specific subsample population 338. A selected option is noted by a small checkmark in the box next to the option. Once the user selects one or more population characteristics for an analysis, the user clicks on a finish button (not shown) so that the subsample stratification can be implemented. The subsample options can be changed or viewed at any time by selecting the Select Subsample category 250. FIGS. 13a and 13b are an exemplary embodiment of a user performance measure interface 350a and 350b, which is displayed after selecting the Data View category 248. The user performance measure interface allows the user to view all the performance measure levels of the survey or data collection information. The hierarchy of the performance measures includes outcome measurement categories 352, measurement domains or domains of care 354, and specific measures 356. Within each outcome measurement category 352 are measurement domains 354, and within each measurement domain is a series of specific measures 356 pertaining to the corresponding domain of care. The measurement domains and specific measures may vary for different surveys or users. Any one of the measures within each domain can be selected and viewed. FIG. 14 illustrates an exemplary embodiment of the specific measure Doctors display 370, which indicates the frequency percentage 374 of the ratings 372. The text of the actual survey question is displayed in a pop-up box 376 when the user's mouse is moved to the lower part of the graph. When the pop-up text box is not in use, a sample value for the measure is displayed (not shown).

Figure 15:
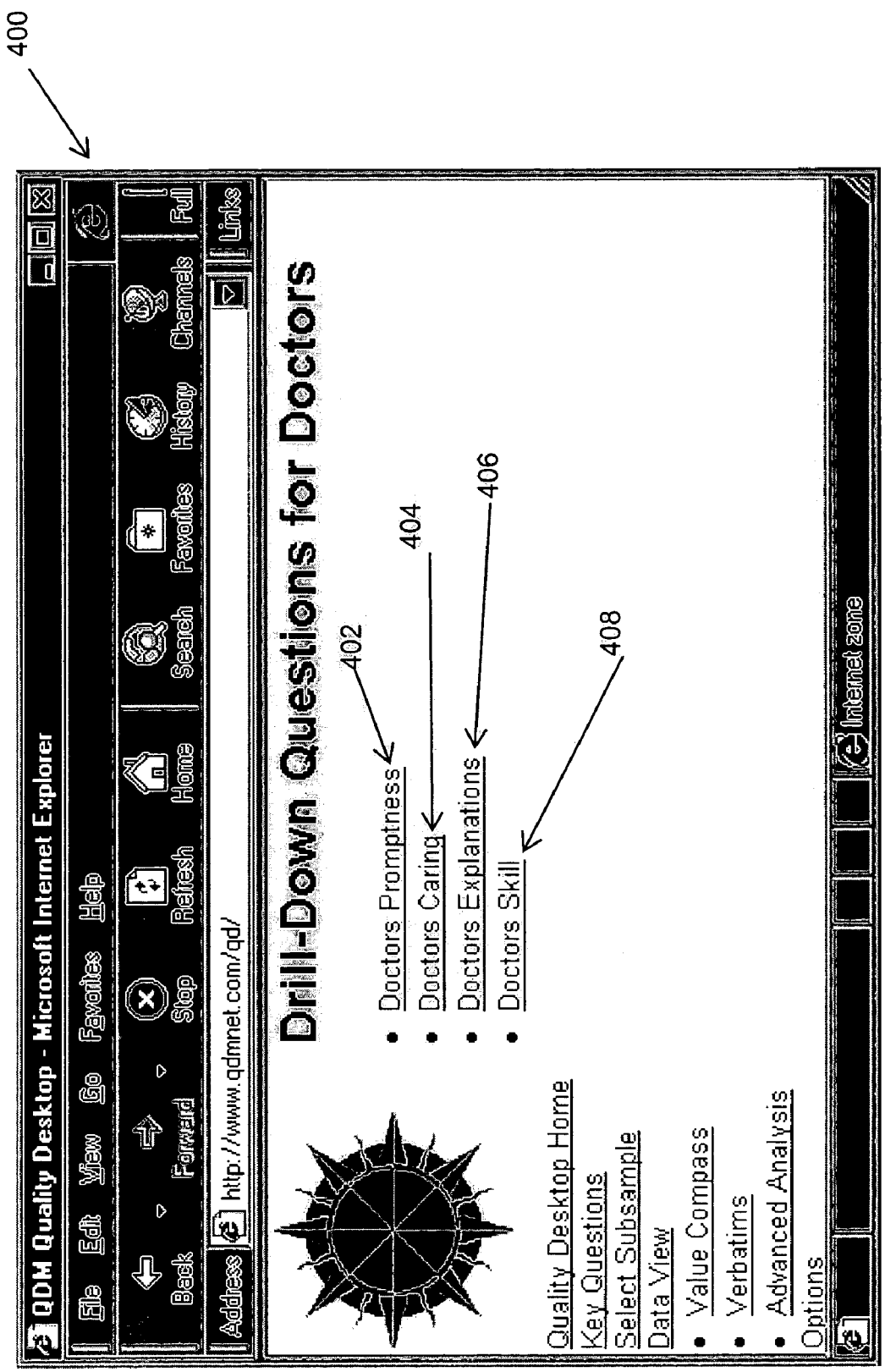
FIG. 15 is an exemplary embodiment of a user drill-down interface.
Figure 16:
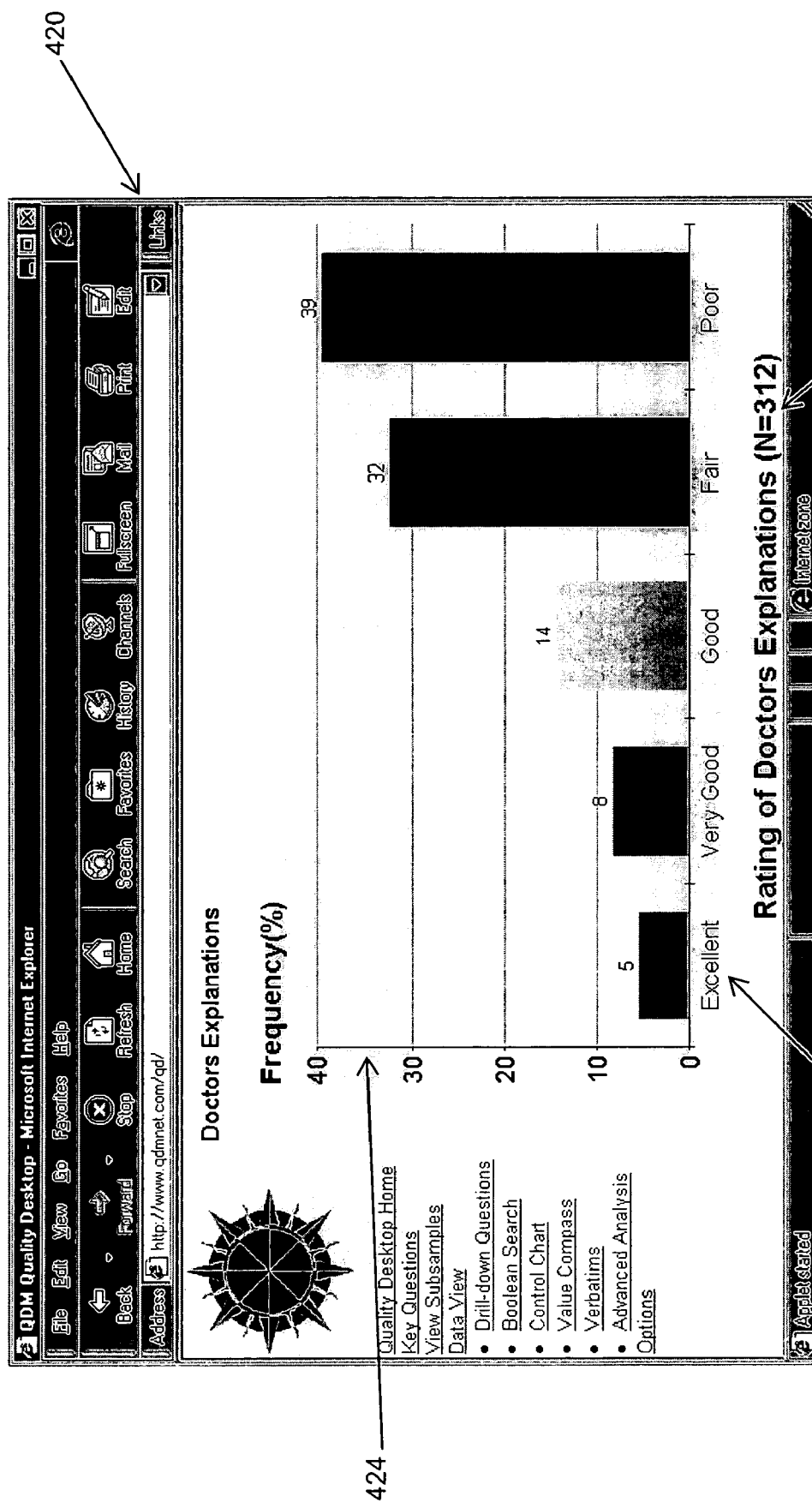
FIG. 16 is an exemplary embodiment of a drill-down display from a drill-down question shown in FIG. 15.

The DPS provides drill-down question inquiries to key questions when a survey respondent scores a question as Fair or Poor. This drill-down feature allows the user the opportunity to more fully understand the specific areas that are linked to the Fair/Poor scores. The drill-down questioning model is more fully discussed in co-pending application INTERACTIVE SURVEY AND DATA MANAGEMENT METHOD AND APPARATUS, Nelson, Ser. No. 09/871, 279, incorporated herein by reference. FIG. 15 is an exemplary embodiment of a user drill-down interface 400 for the specific measure Doctors that was accessed by selecting Drill-Down Questions 378 under Data View category 248. The four drill-down questions related to Doctors care of promptness 402, caring 404, explanations 406, and skill 408 provides additional insight into the Fair or Poor ratings of the doctors overall score shown in specific measure Doctors display 370. FIG. 16 illustrates an exemplary embodiment of a drill-down display 420 related to the drill-down question Doctors Explanation 406 from drill-down interface 400 and indicates the frequency percentage 424 of the ratings 422, including the sample size 426.

Figure 17:
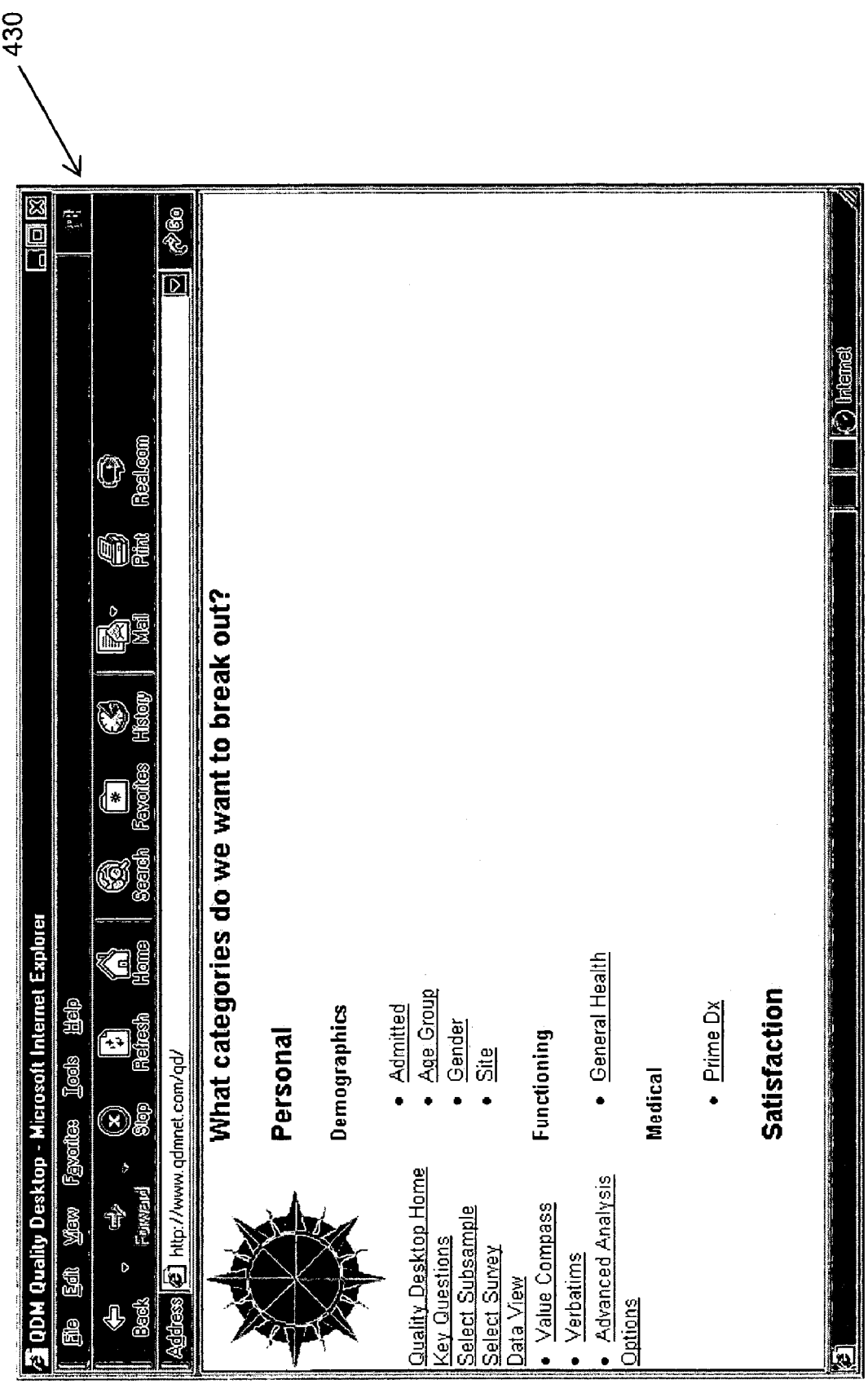
FIG. 17 is an exemplary embodiment of a user boolean search interface.
Figure 18:
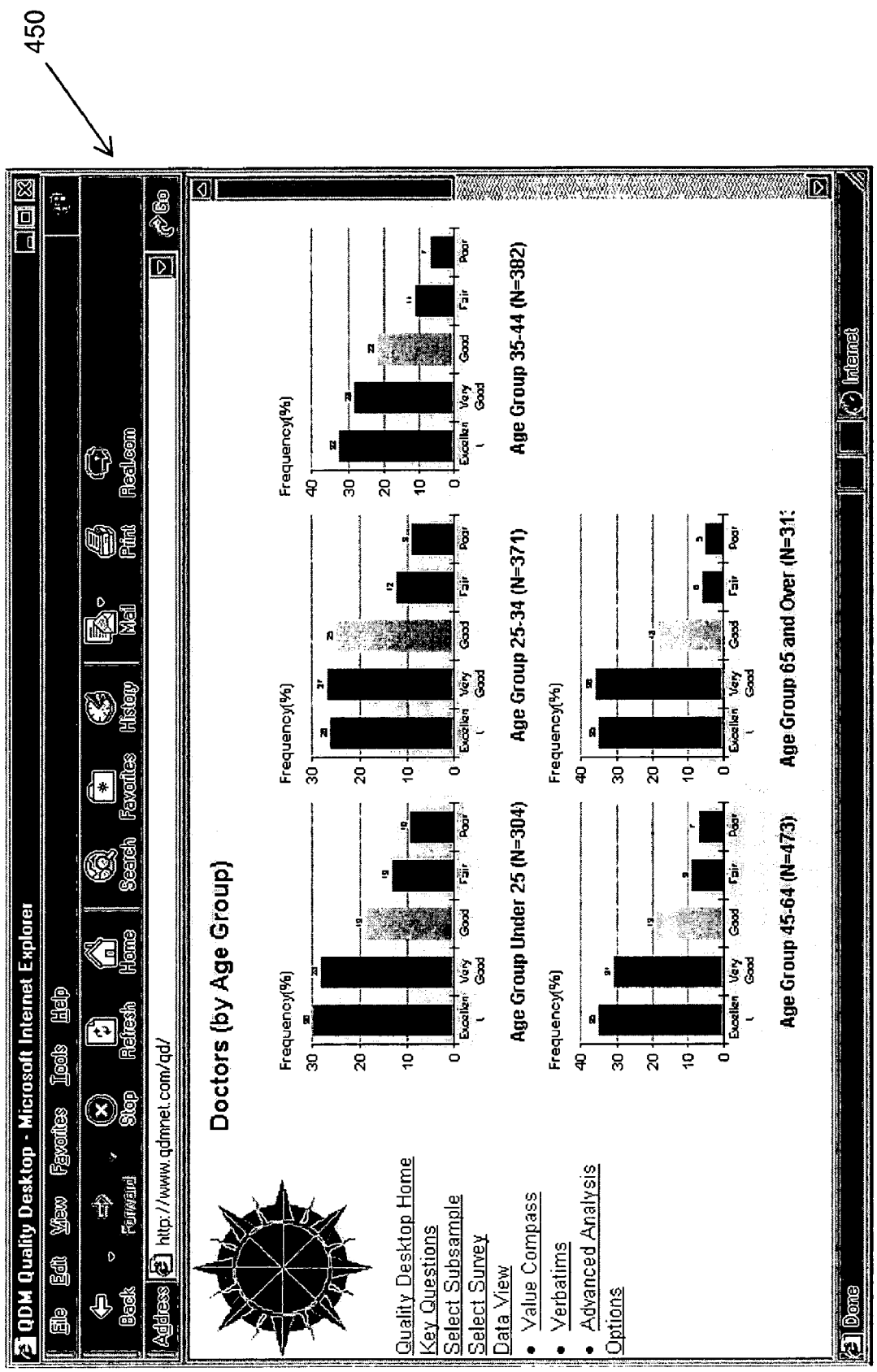
FIG. 18 is an exemplary embodiment of a boolean search display from a specific category shown in FIG. 17.

The DPS also provides the ability to stratify a performance measure so that specific issues can be identified. FIG. 17 is an exemplary embodiment of a boolean search interface 430 for the specific measure Doctors that was accessed by selecting Boolean Search 380 under Data View category 248. FIG. 18 illustrates an exemplary embodiment of a boolean search display 450 which stratified the specific measure Doctor by a specific grouping Age Group.

The DPS enables users to interact directly with their data results and to select, analyze, and receive graphical data displays on a subpopulation of interest; the time period in which this subpopulation received services; the distribution of the results (i.e., on ratings and reports) with respect to overall satisfaction and its related dimensions and subdimensions; the variation in the aforementioned results by selected characteristics of the customer, the setting, or the service provider; and statistical analysis of trends over time in results for selected subpopulations. The user also has the ability to determine the specific factors that are most strongly related to generating overall service satisfaction; the nature of the qualitative, verbatim comments that customers relate to the level of satisfaction or improvements in service delivery; and the greatest sources of service strength and the largest opportunities for improvement in service satisfaction that can be used to assist in the setting of priorities. Thus, as a result of ongoing quality improvement efforts, the performance of the service provider should improve and subsequent surveys should result in higher ratings. As improvements are made, the surveys may be changed or redesign to measure this change or be suspended for certain performance measure.

While the invention has been described with reference to specific embodiments, various changes may be made and equivalents may be substituted for elements thereof by those skilled in the art without departing from the scope of the invention. In addition, other modifications may be made to adapt a particular situation or method to the teachings of the invention without departing from the essential scope thereof. The present invention herein is not to be construed as being limited, except insofar as indicated in the appended claims.

What is claimed is:

1. A method for evaluating survey information for a medical enterprise comprising the steps of:
    collecting said survey information from a plurality of sources, said survey information including:
        satisfaction data from one or more of patients, members of families of the patients, and employees of said medical enterprise,
        physical assessment data representing one or both of physical capabilities and mental capabilities of said patients,
        medical outcome data about said patients,
        clinical process data from said medical enterprise, and
        cost data about costs of said medical enterprise,
    electronically maintaining a database for storing said survey information,
    a user selecting a measurement option from a list of a plurality of available measurement options displayed on a display device, and
    presenting survey assessment results to the user by performing the steps of:
        electronically retrieving from the survey information a subset of said survey information for calculating outputs based on the selected measurement option,
        electronically performing calculations on the subset of information for generating said outputs, and
        electronically controlling the display device to display a graphical report based on the selected measurement option using said outputs,
        wherein said displayed graphical report presents at least four view for evaluating said enterprise, said at least four views including:
            clinical outcome graphical information about said medical enterprise operations calculated by utilizing some portion of said medical outcome data and/or said clinical process data,
            functional outcome graphical information about functional outcomes of said medical enterprise calculated by utilizing some portion of said physical assessment data,
            satisfaction outcome graphical information about satisfaction outcomes of said medical enterprise calculated by utilizing some portion of said satisfaction data, and
            cost outcome graphical information calculated by utilizing some portion of said cost data,
        and wherein said clinical outcome graphical information includes a plurality of mortality and morbidity measures of patients, wherein said functional outcome graphical information includes two or more of physical function, mental health, social function, and health status information of patients, wherein said satisfaction outcome graphical information includes one or both of satisfaction measures of patients and/or their families, and enterprise employees, and wherein said cost outcome graphical information includes one or both of satisfaction measures of patients and/or their families, and enterprise employees, and wherein said cost outcome graphical information includes one or both of measures of direct medical costs and indirect social costs,
    wherein a user choosing another measurement option from said list of measurement options causes a contemporaneous presenting of updated survey assessment results by performing said retrieving, performing calculations, and electronically controlling steps with additional portions of said survey data collected in advance.

2. The system for evaluating survey information of claim 1, wherein the graphical displays are selected by a user through the network.

3. A method according to claim 1, wherein the graphical report is provided to a user through a network.

4. The method according to claim 1, wherein said survey information is collected for a plurality of additional medical enterprises, and wherein said survey assessment results also presents graphical information using said at least four views for comparing said enterprise against at least a plurality of said additional medical enterprises.

5. The method according to claim 4, wherein at least a portion of said survey information is collected over a computer network, and wherein said survey assessment results are provided to the display over the computer network.

6. The method of claim 5, wherein said collecting utilizes a drill-down technique for collecting at least a portion of said survey information.

7. The method of claim 6, wherein said survey information includes verbatims.

8. The method according to claim 1, wherein at least a portion of said survey information is collected over a computer network, and wherein said survey assessment results are provided to the display over the computer network.

9. The method of claim 1, wherein said collecting utilizes a drill-down technique for collecting at least a portion of said survey information.

10. The method of claim 1, wherein said survey information includes verbatims.

11. A method for evaluating survey information of a business enterprise against a plurality of enterprises including said business enterprise, said method comprising the steps of:
  collecting, in advance, said survey information from a plurality of sources, said survey information including:
    satisfaction data from one or more of customers of said plurality of enterprises, members of families of the customers, and employees of said plurality of enterprises,
    assessment data provided by said customers representing customer status with respect to attributes related to services provided to said customers by one or more of said plurality of enterprises,
    results outcome data provided by said enterprises representing customer outcomes from services provided by one or more of said plurality of enterprises,
    enterprise process data about processes of said plurality of enterprises, and
    cost data about costs of each of said plurality of enterprises;
  electronically maintaining a database for storing said survey information;
  a user selecting a measurement option from a list of a plurality of available measurement options displayed on a display device; and
  presenting survey assessment results to a user by performing the steps of:
    electronically retrieving from the survey information a subset of said survey information for calculating outputs based on the selected measurement option,
    electronically performing calculations on the subset of information for generating said outputs, and
    electronically controlling the display device to display a graphical report based on the selected measurement option using said outputs;
  wherein said displayed graphical report presents at least four views for evaluating said business enterprise against said plurality of enterprises, said at least four views including:
    enterprise outcome graphical information about outcomes of said business enterprise services calculated by utilizing some portion of said results outcome data and/or said enterprise process data, said functional outcome graphical information for showing effectiveness of services provided by said business enterprise to its customers,
    functional outcome graphical information about functional outcomes of said business enterprise calculated by utilizing some portion of said assessment data, said functional outcome graphical information for determining a status of customers of said business enterprise pertaining to services provided to said customers by said business enterprise,
    satisfaction outcome graphical information calculated by utilizing some portion of said satisfaction data, said satisfaction outcome graphical information for showing customer satisfaction with respect to services provided to customers of said business enterprise, and
    cost outcome graphical information of said business enterprise calculated by utilizing some portion of said cost data,
  wherein a user choosing another measurement option from said list of measurement options causes a contemporaneous presenting of updated survey assessment results by performing said electronically retrieving, electronically performing calculations, and electronically controlling steps with additional portions of said survey data collected in advance.

12. A system for evaluating survey information for a medical enterprise comprising:
  a survey collecting subsystem for collecting, in advance, said survey information from a plurality of sources, said survey information including:
    satisfaction data from one or more of patients, members of families of the patients, and employees of said medical enterprise,
    physical assessment data representing physical capabilities of said patients,
    medical outcome data about said patients,
    clinical process data from said medical enterprise, and
    cost data about costs of said medical enterprise;
  a server for electronically maintaining a database for storing said survey information;
  a terminal for a user selecting a measurement option from a list of a plurality of available measurement options displayed on a display of said terminal, with the terminal also for presenting survey assessment results to the user using said display, wherein
  said system further includes
    the server electronically retrieving from the survey information a subset of said survey information for calculating outputs based on the selected measurement option;
    the server electronically performing calculations on the subset of information for generating said outputs; and
    the server providing said outputs to the display device for displaying a graphical report based on the selected measurement option using said outputs,
  wherein said displayed graphical report presents at least four views for evaluating said enterprise, said at least four views including:
    clinical outcome graphical information about clinical outcomes of said medical enterprise calculated by utilizing some portion of said medical outcome data and/or said clinical process data,
    functional outcome graphical information about functional outcomes of said medical enterprise calculated by utilizing some portion of said physical assessment data, satisfaction outcome graphical information about satisfaction outcomes of said medical enterprise calculated by utilizing some portion of said satisfaction data, and cost outcome graphical information calculated by utilizing some portion of said cost data, wherein said clinical outcome graphical information includes a plurality of mortality and morbidity measures of patients, wherein said functional outcome graphical information includes a plurality of physical function, mental health, social function, and health status information of patients, wherein said satisfaction outcome graphical information includes one or both of satisfaction measures of patients and/or their families and enterprise employees, and wherein said cost outcome graphical information includes one or both of measures of direct medical costs and indirect social costs, wherein a user choosing another measurement option from said list of measurement options causes a contemporaneous presenting of updated survey assessment results by performing said retrieving, performing calculations, and electronically controlling steps with additional portions of said survey data collected in advance.

13. The system of claim 12 wherein said server is remotely connected to said user terminal over a computer network.

14. The system of claim 12, wherein said survey information is collected for a plurality of additional medical enterprises, and wherein said survey assessment results also presents graphical information using said at least four views for comparing said enterprise against at least a plurality of said additional medical enterprises.

15. The system of claim 12, wherein said survey collecting subsystem utilizes a drill-down technique for collecting at least a portion of said survey information.

16. The system of claim 15, wherein said survey information includes verbatims, at least a number of which are played for said user upon demand.

* * * * *